United States Patent
Dragicevic et al.

(10) Patent No.: US 10,165,350 B2
(45) Date of Patent: Dec. 25, 2018

(54) EARPIECE WITH APP ENVIRONMENT

(71) Applicant: BRAGI GmbH, München (DE)

(72) Inventors: Darko Dragicevic, München (DE); Peter Vincent Boesen, München (DE)

(73) Assignee: BRAGI GmbH, München (DE)

( * ) Notice: Subject to any disclaimer, the term of this patent is extended or adjusted under 35 U.S.C. 154(b) by 0 days.

(21) Appl. No.: 15/641,808

(22) Filed: Jul. 5, 2017

(65) Prior Publication Data

US 2018/0014108 A1 Jan. 11, 2018

Related U.S. Application Data

(60) Provisional application No. 62/359,542, filed on Jul. 7, 2016.

(51) Int. Cl.

| H04R 5/033 | (2006.01) |
| H04R 1/10 | (2006.01) |
| G06F 3/16 | (2006.01) |
| G06F 3/01 | (2006.01) |
| G06F 1/16 | (2006.01) |
| H04M 1/05 | (2006.01) |

(52) U.S. Cl.
CPC .......... *H04R 1/1041* (2013.01); *G06F 1/163* (2013.01); *G06F 1/1694* (2013.01); *G06F 1/1698* (2013.01); *G06F 3/017* (2013.01); *G06F 3/167* (2013.01); *H04M 1/05* (2013.01); *H04R 1/1016* (2013.01); *G06F 2200/1636* (2013.01); *H04R 2420/07* (2013.01)

(58) Field of Classification Search
USPC ... 381/23.1, 26, 74, 309, 328, 367, 370, 376
See application file for complete search history.

(56) References Cited

U.S. PATENT DOCUMENTS

| 2,325,590 | A | 8/1943 | Carlisle et al. |
| 2,430,229 | A | 11/1947 | Kelsey |
| 3,047,089 | A | 7/1962 | Zwislocki |
| D208,784 | S | 10/1967 | Sanzone |
| 3,586,794 | A | 6/1971 | Michaelis |

(Continued)

FOREIGN PATENT DOCUMENTS

| CN | 204244472 U | 4/2015 |
| CN | 104683519 A | 6/2015 |

(Continued)

OTHER PUBLICATIONS

Akkermans, "Acoustic Ear Recognition for Person Identification", Automatic Identification Advanced Technologies, 2005 pp. 219-223.

(Continued)

*Primary Examiner* — Yosef K Laekemariam
(74) *Attorney, Agent, or Firm* — Goodhue, Coleman & Owens, P.C.

(57) ABSTRACT

An earpiece includes an earpiece housing, a processor disposed within the earpiece housing, a memory operatively connected to the processor and disposed within the earpiece housing, and a plurality of software applications stored within the memory. The earpiece is configured to allow a user of the earpiece to select one of the plurality of software applications to run using the processor as a foreground application and allows for receiving user input into the foreground application.

12 Claims, 6 Drawing Sheets

(56) References Cited

U.S. PATENT DOCUMENTS

| | | |
|---|---|---|
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| D601,134 S | 9/2009 | Elabidi et al. |
| 7,825,626 B2 | 11/2010 | Kozisek |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| D666,581 S | 9/2012 | Perez |
| 8,300,864 B2 | 10/2012 | Mullenborn et al. |
| 8,406,448 B2 | 3/2013 | Lin |
| 8,436,780 B2 | 5/2013 | Schantz et al. |
| D687,021 S | 7/2013 | Yuen |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| D788,079 S | 5/2017 | Son et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |

(56) References Cited

U.S. PATENT DOCUMENTS

| | | | |
|---|---|---|---|
| 2006/0074671 A1 | 4/2006 | Farmaner et al. | |
| 2006/0074808 A1 | 4/2006 | Boesen | |
| 2006/0166715 A1 | 7/2006 | Engelen et al. | |
| 2006/0166716 A1 | 7/2006 | Seshadri et al. | |
| 2006/0220915 A1 | 10/2006 | Bauer | |
| 2006/0258412 A1 | 11/2006 | Liu | |
| 2008/0076972 A1 | 3/2008 | Dorogusker et al. | |
| 2008/0090622 A1 | 4/2008 | Kim et al. | |
| 2008/0146890 A1 | 6/2008 | LeBoeuf et al. | |
| 2008/0254780 A1 | 10/2008 | Kuhl et al. | |
| 2008/0255430 A1 | 10/2008 | Alexandersson et al. | |
| 2009/0003620 A1 | 1/2009 | McKillop et al. | |
| 2009/0017881 A1 | 1/2009 | Madrigal | |
| 2009/0073070 A1 | 3/2009 | Rofougaran | |
| 2009/0097689 A1 | 4/2009 | Prest et al. | |
| 2009/0105548 A1 | 4/2009 | Bart | |
| 2009/0191920 A1 | 7/2009 | Regen et al. | |
| 2009/0245559 A1 | 10/2009 | Boltyenkov et al. | |
| 2009/0296968 A1 | 12/2009 | Wu et al. | |
| 2010/0033313 A1 | 2/2010 | Keady et al. | |
| 2010/0203831 A1 | 8/2010 | Muth | |
| 2010/0210212 A1 | 8/2010 | Sato | |
| 2010/0320961 A1 | 12/2010 | Castillo et al. | |
| 2011/0286615 A1 | 11/2011 | Olodort et al. | |
| 2012/0057740 A1 | 3/2012 | Rosal | |
| 2013/0316642 A1 | 11/2013 | Newham | |
| 2013/0346168 A1 | 12/2013 | Zhou et al. | |
| 2014/0072146 A1 | 3/2014 | Itkin et al. | |
| 2014/0079257 A1 | 3/2014 | Ruwe et al. | |
| 2014/0106677 A1 | 4/2014 | Altman | |
| 2014/0122116 A1 | 5/2014 | Smythe | |
| 2014/0163771 A1 | 6/2014 | Demeniuk | |
| 2014/0185828 A1 | 7/2014 | Helbling | |
| 2014/0222462 A1 | 8/2014 | Shakil et al. | |
| 2014/0235169 A1 | 8/2014 | Parkinson et al. | |
| 2014/0270227 A1 | 9/2014 | Swanson | |
| 2014/0270271 A1 | 9/2014 | Dehe et al. | |
| 2014/0348367 A1 | 11/2014 | Vavrus et al. | |
| 2015/0028996 A1 | 1/2015 | Agrafioti et al. | |
| 2015/0110587 A1 | 4/2015 | Hori | |
| 2015/0148989 A1 | 5/2015 | Cooper et al. | |
| 2015/0245127 A1 | 8/2015 | Shaffer | |
| 2016/0033280 A1 | 2/2016 | Moore et al. | |
| 2016/0072558 A1 | 3/2016 | Hirsch et al. | |
| 2016/0073189 A1 | 3/2016 | Lindén et al. | |
| 2016/0125892 A1 | 5/2016 | Bowen et al. | |
| 2016/0210111 A1* | 7/2016 | Kraft | H04R 1/1041 |
| 2016/0360350 A1 | 12/2016 | Watson et al. | |
| 2017/0078780 A1 | 3/2017 | Qian et al. | |
| 2017/0105681 A1* | 4/2017 | Singh | A61B 5/6897 |
| 2017/0111726 A1 | 4/2017 | Martin et al. | |
| 2017/0155992 A1 | 6/2017 | Perianu et al. | |
| 2017/0180844 A1* | 6/2017 | Nanni | H04W 76/10 |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 4/1981 |
| GB | 2508226 A | 5/2014 |
| WO | 2008103925 A1 | 8/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |

OTHER PUBLICATIONS

Announcing the $3,333,333 Stretch Goal (Feb. 24, 2014).
Ben Coxworth: "Graphene-based ink could enable low-cost, foldable electronics", "Journal of Physical Chemistry Letters", Northwestern University, (May 22, 2013).
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From The First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing-Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, On Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2015).
BRAGI Update—On Track, Design Verification, How It Works and What's Next(Jul. 15, 2015).
BRAGI Update—On Track, On Track and Gems Overview.
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Healthcare Risk Management Review, "Nuance updates computer-assisted physician documentation solution" (Oct. 20, 2016).
Hoyt et. al., "Lessons Learned from Implementation of Voice Recognition for Documentation in the Military Electronic Health Record System", The American Health Information Management Association (2017).
Hyundai Motor America, "Hyundai Motor Company Introduces a Health + Mobility Concept for Wellness In Mobility", Fountain Valley, Californa (2017).
Last Push Before The Kickstarter Campaign Ends on Monday 4pm CET (Mar. 28, 2014).

(56) References Cited

OTHER PUBLICATIONS

Nigel Whitfield: "Fake tape detectors, 'from the stands' footle and UGH? Internet of Things in my set-top box"; http://www.theregister.co.uk/2014/09/24/ibc_round_up_object_audio_dlna_iot/ (Sep. 24, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for The Dash (Feb. 12, 2014).
Stretchgoal—Windows Phone Support (Feb. 17, 2014).
The Dash + The Charging Case & The BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).
Weisiger; "Conjugated Hyperbilirubinemia", Jan. 5, 2016.

\* cited by examiner

EARPIECE WITH APP ENVIRONMENT

PRIORITY STATEMENT

This application claims priority to U.S. Provisional Patent Application No. 62/359,542, filed Jul. 7, 2016, and entitled "Earpiece with App Environment", hereby incorporated by reference in its entirety.

FIELD OF THE INVENTION

The present invention relates to wearable devices. More particularly, but not exclusively, the present invention relates to ear pieces which provide an app environment.

BACKGROUND

Earpieces are generally specific purpose devices with little or no intelligence. What is needed is an intelligent earpiece with enhanced functionality which includes a wide range of processing capabilities. However, given the size constraints on earpieces (including size constrains on battery space) there are limitations in the ability to process. What is needed is an earpiece or set of earpieces which allows for a wide range of processing capabilities.

SUMMARY

Therefore, it is a primary object, feature, or advantage of the present invention to improve over the state of the art.

It is a further object, feature, or advantage of the present invention to provide an earpiece with an app environment.

It is a still further object, feature, or advantage of the present invention to provide an earpiece that allows a user to select an app to run in the foreground or the background.

Another object, feature, or advantage is to allow a user to determine which app of a plurality of different apps on an earpiece is to receive user input.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

According to one aspect, an earpiece includes an earpiece housing, a processor disposed within the earpiece housing, a memory operatively connected to the processor and disposed within the earpiece housing, and a plurality of software applications stored within the memory. The earpiece is configured to allow a user of the earpiece to select one of the plurality of software applications to run using the processor as a foreground application and allows for receiving user input into the foreground application.

According to another aspect, a method for controlling an earpiece is provided. The method includes installing a plurality of different software applications within an earpiece, receiving a selection of one of the plurality of different software applications from a user through a user interface of the earpiece, and executing the one of the plurality of different software applications based on the selection in a foreground mode of operation for the earpiece. The method may further include receiving user input from the user of the earpiece through the user interface and receiving the user input into the one of the plurality of different software applications in the foreground mode of operation.

DETAILED DESCRIPTION

Figure 1:
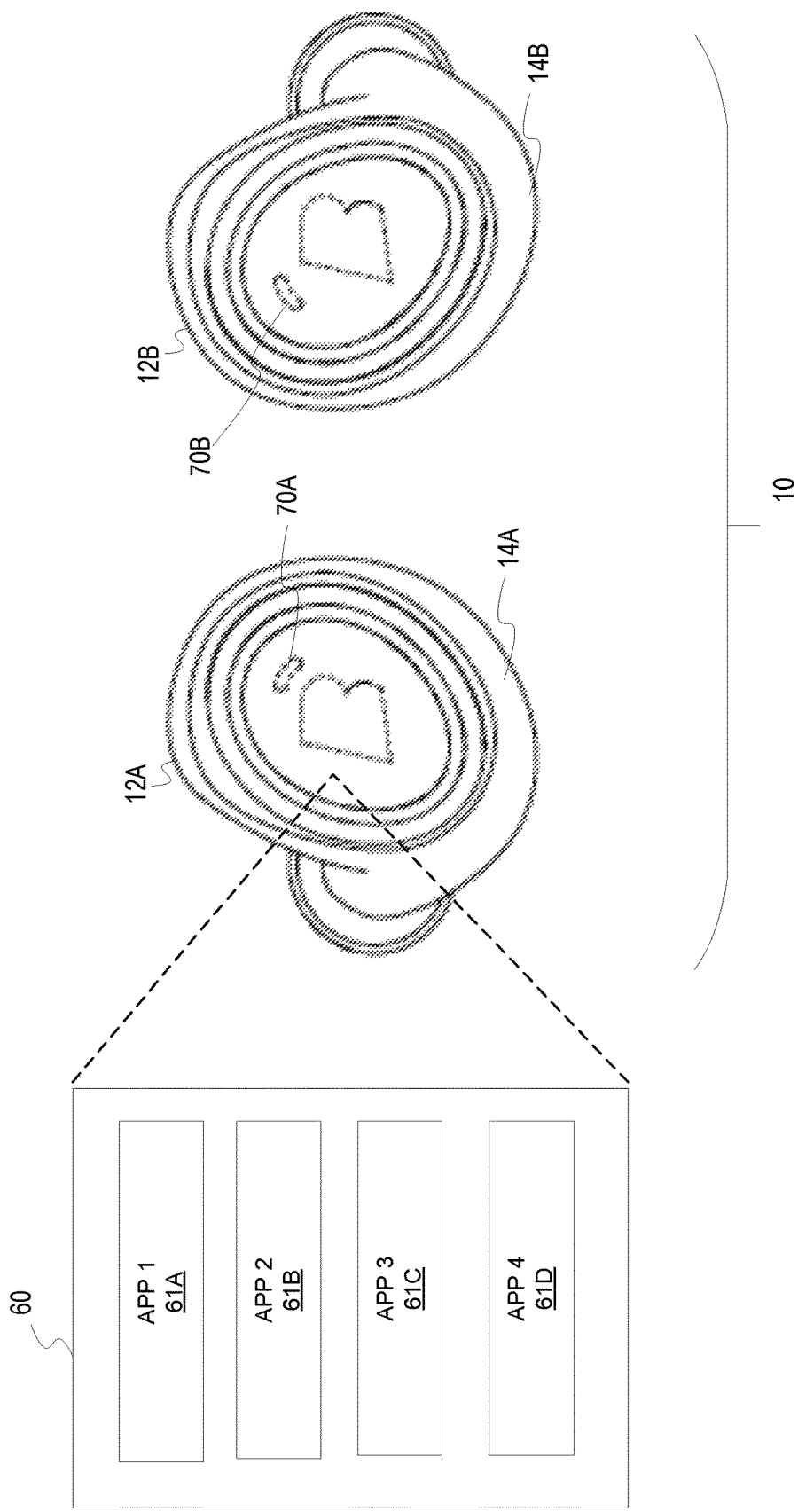
FIG. 1 illustrates one embodiment of a system where one or more earpieces are configured with an app environment.

FIG. 1 illustrates one embodiment of a system 10 which includes a left earpiece 12A and a right earpiece 12. The left earpiece 12A has a left earpiece housing 14A and the right earpiece 12B has a right earpiece housing 14B. An external microphone 70A is shown at the left earpiece 12A and another external microphone 70B is shown at the right earpiece 12B. A plurality of software applications or apps are shown which may be stored on a memory of one or more of the earpieces is also shown.

The earpiece 12A allows a user to place one or more apps 61A, 61B, 61C, 61D on the device within storage or other memory 60 of the device and provides a user interface to allow a user to select one of the apps to run in the foreground or background or to select as the active app to receive user input. This app environment provides a number of different advantages. First, not all functionality needs to be built-into the operating system for the earpiece 12A (or set of earpieces 12A, 12B). Instead functionality may be delivered as an app to the earpiece 12A and a user need only store or execute the apps on their earpiece 12A which they wish to use. Second, issues regarding limitations on processing ability and battery use are reduced when only those apps which a user wishes to use need be present on a device.

The app environment allows a user to determine which app or apps are run in the background. Because the earpiece may include any number of different sensors and combinations of sensors and perform any number of different functions, there are also many instances where it may be useful for an app to be running in the background without requiring any attention from the user. For example, an app may simply be monitoring physiological sensors associated with the user either storing the data for later use or analysis or monitoring to determine when measured physiological parameters meet or exceed some threshold of interest. Or the app may simply be monitoring environmental sensors and either storing the data for later use or analysis or monitoring to determine when measured environmental parameters meet or exceed some threshold of interest. Or the app may simply be communicating information with other wearable device, mobile devices, or other types of computing devices. There are any number of different functions that an app may be performing related to collecting, processing, or communicating data. It is to also be understood that some apps may have very specific purposes.

In operation, the device may consider one application to be a foreground app or a background app. As used herein, the term "foreground" refers to an application or task that is currently being used by the user. Such an application or task may be interrupt-driven or real-time processes. As used herein, the term "background" refers to an application or task that is running but not currently being directly used by the user or otherwise considered to be in the background by the user. The device may determine which app or apps are running as well as which app is to be run in the foreground either automatically based on context or alternatively based on user input.

Figure 2:
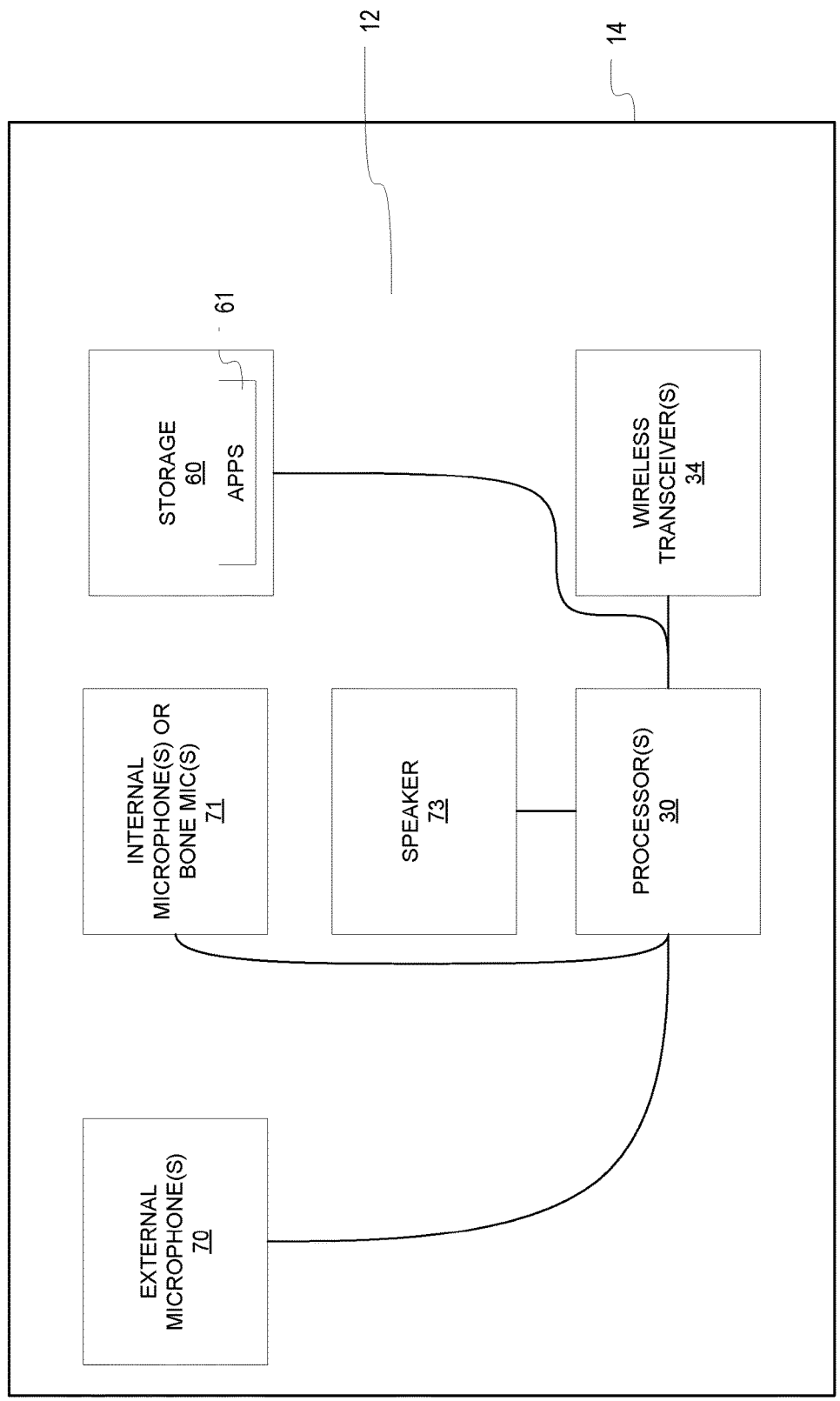
FIG. 2 is a block diagram of an earpiece which provides an app environment.

FIG. 2 illustrates one example of a block diagram of an earpiece 12. The ear piece 12 includes an earpiece housing 14. Disposed within the earpiece housing 13 is a processor 30. The term "processor" as used herein means a single processor or more than one processor in operative communication. The processor 30 may include a digital signal processor, a microprocessor, microcontroller and/or other types of processors, or combinations of these or other types of processors. One or more internal microphones or bone microphones 71 may be operatively connected to the processor 30. One or more external microphones 70 may be operatively connected to the processor 30. One or more wireless transceivers 34 may be operatively connected to the processor. One or more speakers 73 may be operatively connected to the processor 30. A memory or storage unit 60 may be provided which is operatively connected to the processor 30. The memory or storage unit 60 may store one or more software applications or apps 61. Each app may include a set of software instructions for execution by the processor 30.

Figure 3:
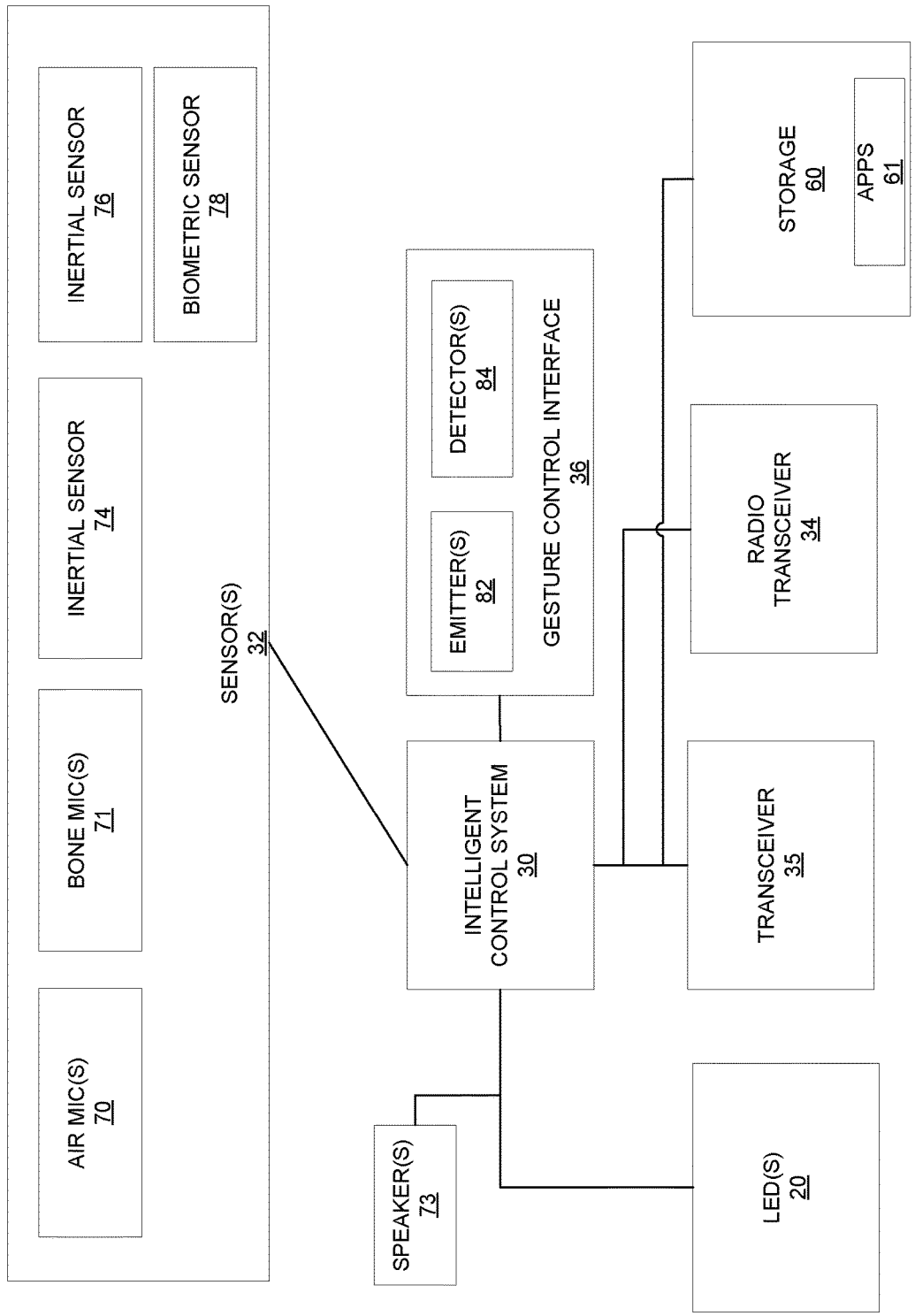
FIG. 3 is another block diagram of an earpiece which provides an app environment.

FIG. 3 illustrates another example of a block diagram of an earpiece. The earpiece includes a sensor array 32 which includes one or more sensors. Examples of the type of sensors 32 which may be present include an air microphone 70, a bone microphone 71, a first inertial sensor 74, a second inertial sensor 76, a biometric or physiological sensor 78. Of course any number of other sensors may be present. The sensors 32 are operatively connected to an intelligent control system or processor 30. A gesture control interface 36 is also operatively connected to the intelligent control system 30. The gesture control interface 36 may be infrared based, ultrasound based, capacitive sensor based or use other technologies. The gesture control interface 36 may include one or more emitters 82 and one or more detectors 84. In operation, a user may make gestures which are detected by the gesture control interface 36. Examples of gestures may include, single taps, double taps, tap and hold, swipes in various directions or other types of gestures. One or more transceivers may also be operatively connected to the intelligent control system or processor 30. For example, a radio transceiver 34 may be used for Bluetooth or Bluetooth Low Energy (BLE) communications. The radio transceiver 34 may be used to communicate with other wearable devices, mobile devices such as phones or tablets, or other types of computing devices. The transceiver 35 may be a near field magnetic induction (NFMI) transceiver or other type of transceiver such as may be used to communicate with another earpiece. The earpiece may further include one or more lighting elements such as LEDs 20 and may also include one or more speakers 73. It is to be noted that the earpiece may provide a number of different ways to receive user input from a user. This may include receiving user input through the gesture control interface 36, receiving user input from one or more inertial sensors 76, 78 (such as receiving a head nod to indicate yes or side-to-side head movement to indicate no), receiving voice input from one or more microphones 70, 71, or otherwise receiving input from a user such as indirectly through another device in operative communication with the earpiece via the radio transceiver 34 or transceiver 35.

Figure 4:
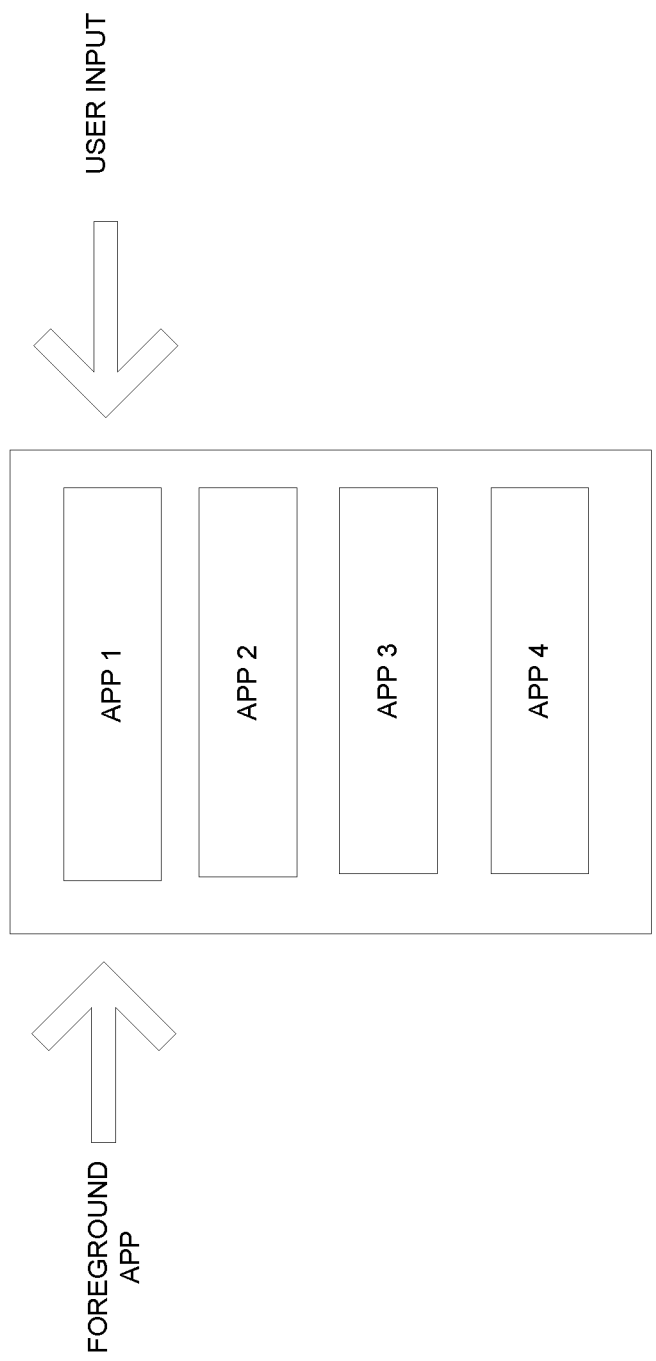
FIG. 4 illustrates an environment with multiple apps where one of the apps is considered a foreground app and which receives user input.

FIG. 4 illustrates a plurality of apps stored in a machine readable storage medium such as a memory where one of the apps is selected as a foreground app. The rest of the apps may remain in the background. The app which is in the foreground may receive user input from a user. A user may select which app is the foreground app in a number of different ways. For example, where a gestural interface is present, a gesture may be associated with app selections. In one embodiment, a user may be prompted with the name of an app and then either select the app to make the app the foreground app or wait for or move on to the name of the next app in a list or circular list of available apps. In order to improve the efficiency of the user interface, it is contemplated that the list of available apps may be ordered in a manner such that the app that the user most likely wants to select is the first app in the list presented to the user. One way in which the apps may be ordered is based on which app was most recently used, which is mostly frequently used by the user, the app most frequently used by the user at the same time of day or at the same location, or based on other variables and relationships which may predict what a user's preference may be. Other methodologies which may be used may include ordering the list based on the last app used by the user, or based on pattern analyses performed based on usage history or other parameters.

Figure 5:
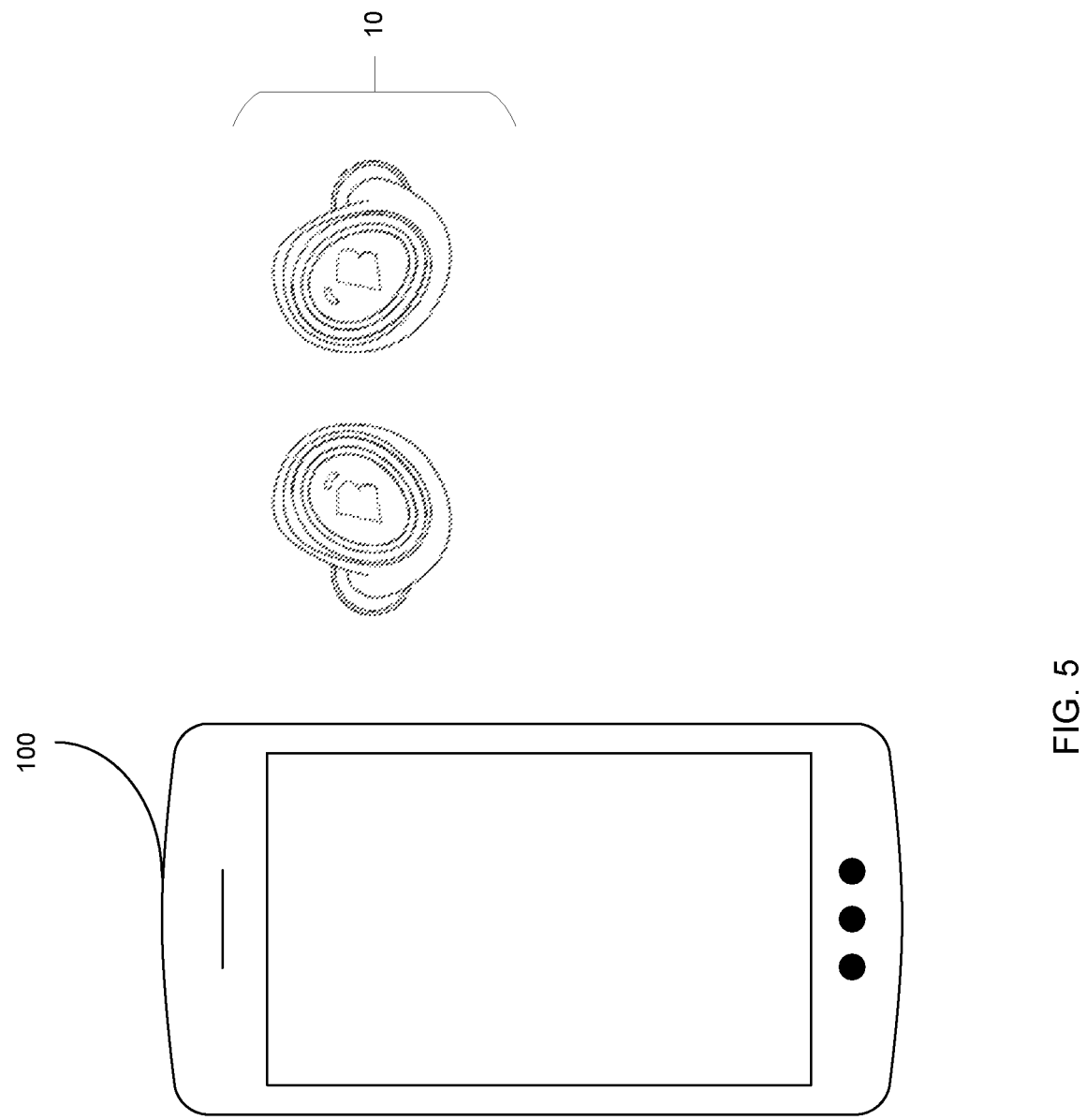
FIG. 5 illustrates a mobile device in communication with a set of earpieces.

Instead of using a gestural interface, other types of user interfaces may be used. For example, a user may provide voice input to indicate that the user wants to select a particular app, such as, "Bragi, run [name]" or "Bragi, run the [name] app" or "Bragi, app menu" or other voice input. Of course, other types of user interfaces may be used. For example, where the earpiece is in communication with a mobile device, the user interface of the mobile device may be used to select an app to execute. Similarly, where the earpiece is in communication with a vehicle, entertainment device, or other computing device with a user interface, the user interface of the other device may be used to select an app to execute on the earpiece. In addition, the user may schedule when the various apps are executed in advance. For example, FIG. 5 illustrates that a mobile device 100 may be in operative communication with one or more earpieces 10. A user may use the mobile device 100 or a program executing on the mobile device 100 to select which app to run on the earpiece system 10 or to download one or more applications to the earpiece(s) 10 for execution. It is contemplated that an app need only be stored and executed on one of the earpieces and that data may be communicated to and from the other earpiece.

Any number of different apps may be present on the earpiece. This may include apps for business, apps for productivity, apps for health and wellness, apps for entertainment, and other types of apps. Apps may be apps for storing or analyzing sensor input, apps for interacting with other devices, apps for playing media or media streams, apps for augmenting environmental audio signals or other audio, or other types of apps.

It is also to be understood that one or more apps may be added to the earpiece by a user. This may occur by downloading the app to the earpiece either through direct connection or wirelessly. Thus, a user may decide which apps are present on their device and include only those apps of interest.

Figure 6:
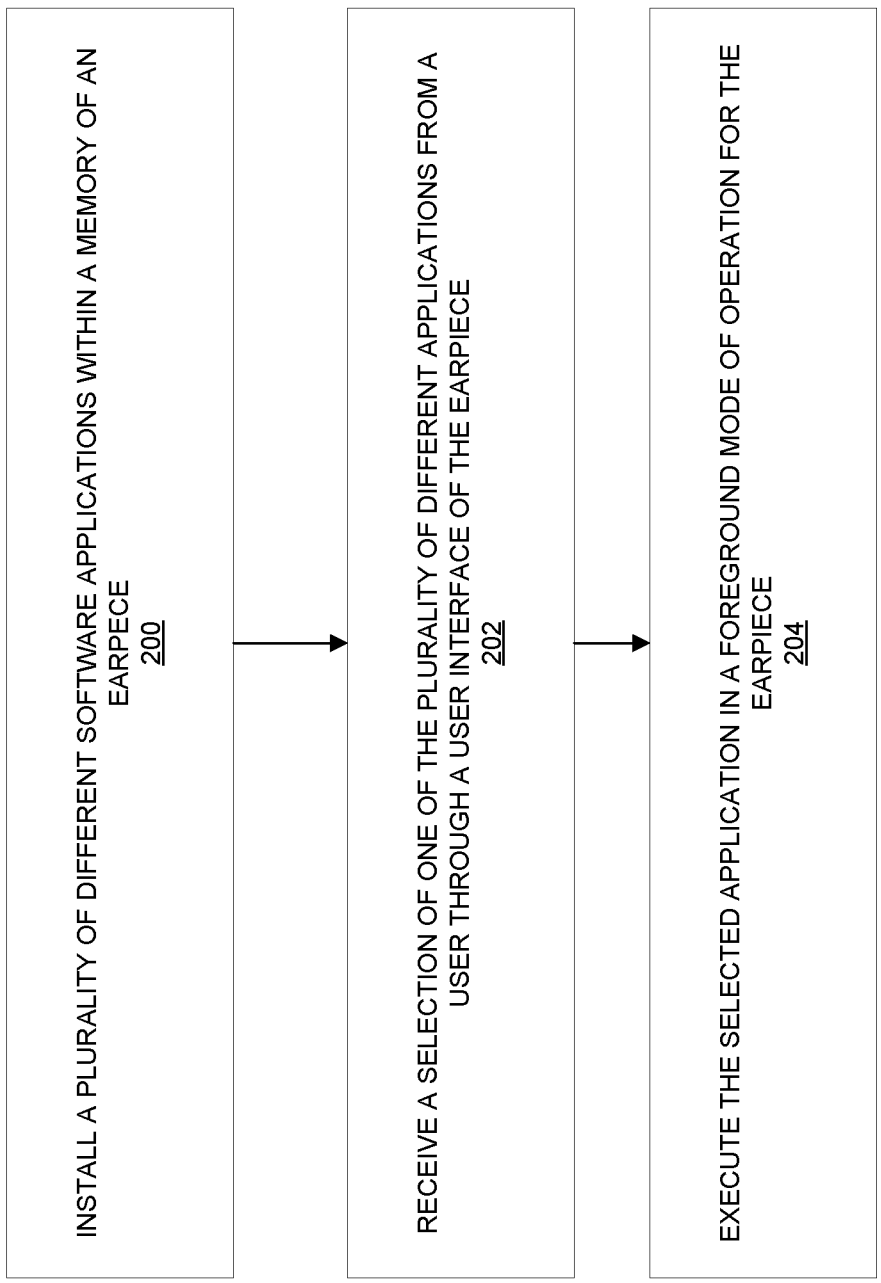
FIG. 6 illustrates one example of a methodology.

FIG. 6 illustrates one example of a methodology. In step 200 a plurality of different software applications are installed within a memory of an earpiece. These software applications may come pre-installed or loaded by a manufacturer or distributor and/or may include one or more software applications installed or loaded by a user or other entity. In step 202, a selection of one of the plurality of different applications is received from a user through a user interface of the earpiece. In step 204. The selected application may be executed in a foreground mode of operation for the earpiece. When the application is executed in the foreground mode of operation, the application may receive user input through the user interface.

Therefore, earpieces with an app environment have been shown and described. The present invention contemplates numerous variations in the apparatus, systems, and methodologies shown and described and it is not to be limited to the specific embodiments provided herein.

What is claimed is:

1. An earpiece comprising:
    an earpiece housing;
    a processor disposed within the earpiece housing:
    a memory operatively connected to the processor and disposed within the earpiece housing; and
    a plurality of software applications stored within the memory;
    wherein the earpiece is configured to allow a user of the earpiece to select one of the plurality of software applications to run using the processor as a foreground application of the earpiece; and
    wherein the earpiece is further configured to receive user input from the user in the form of movement of the user detected with an inertial sensor operatively connected to the processor into the foreground application.

2. The earpiece of claim 1 further comprising a microphone and wherein the user input comprises voice input received from the user using the microphone.

3. The earpiece of claim 1 wherein the earpiece is further configured to download an additional software application to the memory using a wireless transceiver disposed within the earpiece housing.

4. A method for controlling an earpiece comprising:
    installing a plurality of different software applications within an earpiece;
    receiving a selection of one of the plurality of different software applications from a user through a user interface of the earpiece;
    executing the one of the plurality of different software applications based on the selection in a foreground mode of operation for the earpiece; and
    receiving user input from the user of the earpiece through the user interface into the one of the plurality of different software applications in the foreground mode of operation, wherein the user input comprises movement of the user received at an inertial sensor of the earpiece.

5. The method of claim 4 wherein the user input further comprises voice input received at a microphone of the earpiece.

6. The method of claim 4 wherein the user input further comprises a gesture received at a gestural control interface of the earpiece.

7. The earpiece of claim 1 wherein the earpiece is further configured to allow the user to select one of the plurality of software applications to run as a background application using the processor.

8. The earpiece of claim 7 wherein the background application run by the processor is used for monitoring physiological parameters associated with the user.

9. The method of claim 4 further comprising presenting the plurality of software applications through the user interface.

10. The method of claim 9 wherein the plurality of software applications comprises business applications, productivity applications, health applications, entertainment applications, sensor analysis applications, streaming media applications, and audio amplification applications.

11. The method of claim 9 wherein the plurality of software applications presented by the user interface are ordered by recent usage.

12. The method of claim 11 wherein the plurality of software applications presented by the user interface are based on a pattern analysis.

* * * * *